No. 765,325. PATENTED JULY 19, 1904.
W. R. SHARP.
STEAM TRAP.
APPLICATION FILED MAR. 28, 1904.
NO MODEL.
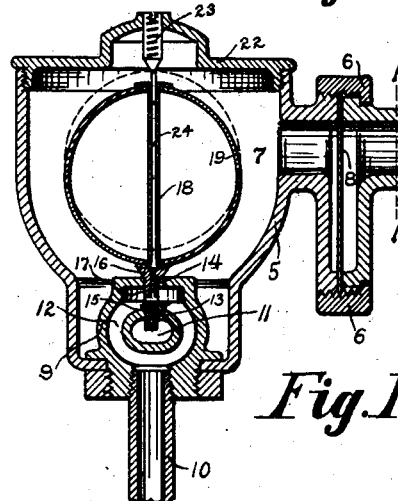
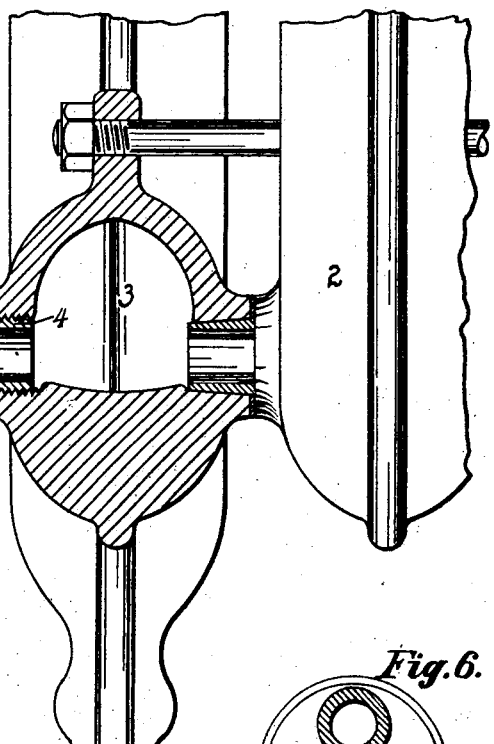
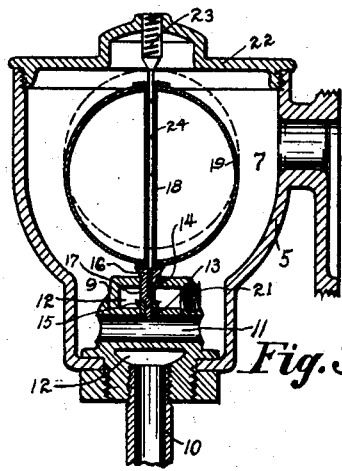
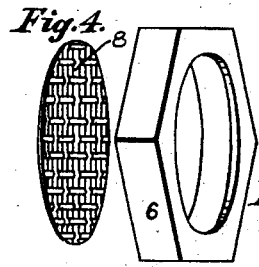
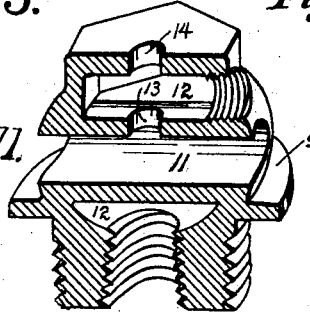
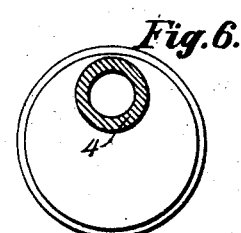
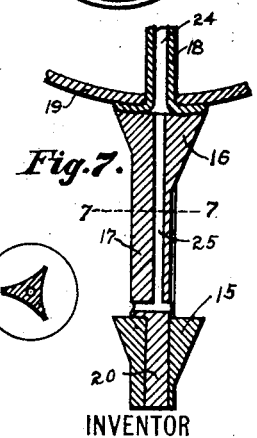
WITNESSES:
Joseph J. Hosler.
J. R. Bond.
INVENTOR
William R. Sharp.
BY J. W. Bond
ATTORNEY No. 765,325.

Patented July 19, 1904.

UNITED STATES PATENT OFFICE.

WILLIAM R. SHARP, OF NEW PHILADELPHIA, OHIO.

STEAM-TRAP.

SPECIFICATION forming part of Letters Patent No. 765,325, dated July 19, 1904.

Application filed March 28, 1904. Serial No. 200,312. (No model.)

*To all whom it may concern:*

Be it known that I, WILLIAM R. SHARP, a citizen of the United States, residing at New Philadelphia, in the county of Tuscarawas and State of Ohio, have invented certain new and useful Improvements in Atmospheric and Vacuum Steam-Traps; and I do hereby declare that the following is a full, clear, and exact description of the same.

The object and purpose of the present invention is to remove the water of condensation from radiators or other heating-surfaces in connection with steam heating or drying systems to atmosphere or under vacuum automatically without the loss or escape of steam.

Figure 1 is a view showing a portion of the radiator and the different parts of the trap proper in section, showing trap attached. Fig. 2 is a top view showing a portion of the cover for the float-chamber. Fig. 3 is a vertical section showing the trap-chamber detached from the radiator. Fig. 4 is a detached view of the screen-disk. Fig. 5 is a detached view of the coupling-nut. Fig. 6 is a sectional view on line 1 1, Fig. 1. Fig. 7 is a detached sectional view of the valve-stem and valves, showing a portion of the float. Fig. 8 is a transverse section on line 7 7, Fig. 7, looking downward. Fig. 9 is a detached view of the guide-stem and atmospheric-valve seat. Fig. 10 is a transverse section on line 9 9, Fig. 9. Fig. 11 is a sectional view of the valve-seat housing.

The present invention has relation to atmosphere and vacuum steam-traps; and it consists in the novel arrangement hereinafter described, and particularly pointed out in the claims.

Similar numerals of reference indicate corresponding parts in all the figures of the drawings.

In the accompanying drawings, 1 represents the end section of a radiator-column, and 2 represents one of the intermediate radiator-columns, which columns are constructed in the ordinary manner and connected together in any well-known and convenient manner.

No detailed construction of the radiator-columns is deemed necessary, inasmuch as the present invention does not apply particularly to a radiator, inasmuch as the radiator may be of any general and well-known construction.

The radiator-column 1 is provided with the chamber 3, which chamber is for the purpose of receiving the water of condensation from the radiator-columns.

To the chamber 3 is attached the pipe 4, and to said pipe is attached the trap-housing 5 by means of the coupling-collar 6.

For the purpose of preventing scales and dirt from entering the trap-chamber 7 the strainer-disk 8 is provided, which strainer is located between the adjacent ends of the pipe 4 and the trap-housing 5, substantially as illustrated in Fig. 1.

To the bottom or lower portion of the trap-housing 5 is attached the valve-seat housing 9, and to said valve-seat housing is attached the drain-pipe 10. The valve-seat housing 9 is provided with the open passage 11, which passage communicates with the trap or float chamber 7, and around the passage 11 is formed the atmospheric and vacuum chamber 12, the chamber 12 being atmospherically open or under vacuum at all times.

Directly over the passage 11 is located the valve-opening 13. At top of chamber 12 and directly over the valve-opening 13 is located the valve-opening 14 and in which openings are normally located the valves 15 and 16, said valves being connected by means of the valve-stem 17.

To the top valve 16 is attached the air-tube 18, which air-tube extends upward through the float 19, said tube being securely attached at its top and bottom ends to said float.

For the purpose of providing a means for locating the valves 15 and 16 in proper position with reference to their seats the valve 15 is formed separate from its valve-stem 17 and said valve securely attached by means of the extension 20 and upon which extension is located the valve 15.

In assembling the different parts pertaining to the valves the chamber 12 is provided with the removable plug 21, and when said plug is removed the valve 15 can be placed in the position illustrated in Figs. 1 and 3, and the valve-stem 17, together with the valve 16, properly connected together.

It will be understood that in order to assemble the different parts, together with the float 19, the cap or cover 22 is to be removed, and after the parts have been properly connected and arranged the cap or cover is placed in the position illustrated in Figs. 1 and 3, thereby properly closing the trap-chamber 7.

The cover 22 is provided with the adjustable valve and guide 23, the lower portion of said guide being formed so that it will enter into the passage 24, formed in the air-tube 18, which opening leads to and communicates with the opening 25, formed in the valve-stem 17, and said opening at its bottom or lower portion communicating with the chamber 12.

The object and purpose of providing the passage 24 is to provide means for the escape of air from the trap-chamber and radiator into the chamber 12 and thence to atmosphere or vacuum pump through the pipe 10. In order to accomplish this result, it will be understood that the guide-stem 26 should be corrugated or grooved, as illustrated in Fig. 10.

It will be understood that the normal position of the float 19 is that shown in Figs. 1 and 3, and when in that position both valves are closed.

In use after the air has been removed from the trap-chamber 7 and the radiator through the passage 24 and water of condensation enters the trap-chamber 7 from the radiator the float 19 will be elevated, the air-tube moving upward with the float following the guide-stem 26 until the upper end of said air-tube 18 comes in contact with the bottom of the guide and closes the passage 24 and opens valves 15 and 16, thereby allowing the water to pass the valves 15 and 16 and pass through the pipe 10.

When the level of the water in the trap-chamber 7 is lowered, the float will follow downward with the downward level of the water, thereby closing the valves and cutting off the flow of water and open the air-tube.

The object and purpose of providing the two valves 15 and 16 is to provide counterbalance-valves, locating one of the valves over vacuum-chamber and the other in vacuum-chamber. It will be understood that the chamber 12 is a vacuum-chamber only when this device is working on or connected with a vacuum system of heating or drying.

Having fully described my invention, what I claim as new, and desire to secure by Letters Patent, is—

1. In a trap of the class described the combination of a chamber, a float located therein, an air-tube extended through the float and secured thereto, a valve-seat housing located below the float-chamber and provided with a passage communicating with the float-chamber, valves located one above the other and between the float-chamber and vacuum-chamber respectively, and an adjustable guide-stem extended into the air-tube of the float all arranged, substantially as and for the purpose specified.

2. The combination of a float-chamber and a float located therein, an air-tube extended through the float and secured thereto, valve-seat housing having a vacuum-chamber, valves located one above the other and between the float-chamber and vacuum-chamber respectively, and a corrugated guide-stem located in the air-tube all arranged, substantially as and for the purpose specified.

In testimony that I claim the above I have hereunto subscribed my name in the presence of two witnesses.

WILLIAM R. SHARP.

Witnesses:
P. F. OLMSTEAD,
LAURA J. SHARP.